US Patent 3,639,331
Patented Feb. 1, 1972

3,639,331
GLASS FIBER REINFORCED RESINS CONTAINING DISPERSION AID
Kiyoshi Hattori and Elby Leon Richardson, Evansville, Ind., assignors to Dart Industries Inc., Los Angeles, Calif.
No Drawing. Filed Mar. 25, 1968, Ser. No. 715,574
Int. Cl. C08f 45/10
U.S. Cl. 260—31.8        20 Claims

ABSTRACT OF THE DISCLOSURE

Novel glass fiber reinforced thermoplastics having better dispersion of the glass fibers therein and process consisting of incorporation of an additive such as a lubricant, plasticizer or low molecular weight resin to reduce the melt viscosity of the resin surrounding the glass fiber relative to the viscosity of the unreinforced resin at the melt temperature.

FIELD OF THE INVENTION

This invention relates generally to novel glass reinforced thermoplastic compositions and to a process for preparing them and more particularly to a process for forming shaped articles involving a novel technique for facilitating the dispersion of the glass fibers in the final article. The novel compositions herein are particularly adapted for injection, extrusion and transfer molding. Further, the compositions provided by the process of this invention produce, when molded or extruded, articles which have high dimensional stability, high modulus of elasticity, high tensile strength, unusually high impact strength and low shrinkage during molding.

PRIOR ART

Fiber glass, glass mat, and similar ceramic-like materials have been used to fill plastics which are formed in pressure molds. Glass filled plastic compounds suitable for injection molding have been found highly useful; however, in using fiber glass filaments, glass threads, or roving, compounded with a suitable molding plastic, it has been difficult to provide an injection molding compound which will disperse the fibers properly, that is, uniformly when the compound is molded in an injection molding machine. Non-uniform dispersion of the fibers results in molded articles with unattractive visual appearance, non-glossy surface and difficult to paint or vacuum metallize surfaces. Usually the fibers are concentrated in some areas and absent in others and in some cases, non-uniform dispersion affects (detrimentally) physical properties to some extent.

Known glass fiber reinforced injection molding compositions have been described and claimed in U.S. Pat. 2,877,501 to R. Bradt, said patent describing compositions consisting of from 15 to 60 percent by weight of glass fiber, the remainder being the resin. The properties of the glass fiber reinforced thermoplastics prepared from the teachings of U.S. Pat. 2,877,501 are among the best to be found among reinforced thermoplastic resins. The compositions specifically include those wherein the glass fibers are generally aligned, that is, oriented parallel to the long axis of the pellet. These compositions are usually prepared by impregnating glass roving with thermoplastic resin and thereafter pelletizing the impregnated resins to obtain thermoplastic pellets containing glass fibers, which in specific cases may be as long as the pellet itself. The process and compositions of the Bradt technique may result also when blended, in some instances, in glass reinforced compositions of marginal dispersibility.

In addition to the technology illustrated in the Bradt patent there are other methods for preparing glass reinforced thermoplastics. A material commonly referred to in the industry as "short fiber glass" reinforced thermoplastics can be prepared by feeding fiber glass pre-chopped into short, approximately ¼ inch, lengths together with thermoplastic resin to the feed pocket of a plastic extruder and co-extruding the mixture of fiberglass and thermoplastic as strands, subsequently cutting these strands into small pellets suitable for injection molding. The products produced by this specific method also contain glass fibers dispersed within the granule, and the fibers are of short length, commonly between 0.02 inch to 0.07 inch, despite the fact that much longer glass fibers are fed to the extruder. The fiber length reduction is caused by the extensive grinding action which takes place among the hard thermoplastic pellets and fiber glass as the mixture is compressed in the feed screw of the extruder.

Two similar and specific methods of practicing the art of manufacturing short glass reinforced thermoplastic resins exist in the industry. One method relates to the feeding of pre-chopped fiberglass and non-reinforced thermoplastic in separate streams to the hopper of the screw injection molding machine while the second method concerns the chopping of continuous strand fiberglass roving directly above the injection molding machine hopper and the freshly chopped glass is mixed in the hopper with non-reinforced thermoplastic resin.

While the above described published processes for preparing the so called "short fiber glass" and "long fiber glass" reinforced thermoplastics, there is still a further process, not as yet published, which concerns the manufacture of concentrated glass fiber reinforced resins. This process employs a minor amount of resin as one component and a major proportion of glass fibers, that is, from about 70 to 90 percent as the other component and forms injection molding granules by a process to be referred to hereinafter. In the compositions resulting from this process, the fiber glass is concentrated rather heavily in the granules and these are highly useful as "masterbatch" compositions which are "let-down" with unreinforced resins (i.e. "blended").

Regardless of how the fiber glass reinforced resin is prepared, dispersibility of the glass fibers within the resin is often a problem with respect to these resins and such non-dispersibility leads to clumps of fiber glass and resin-rich areas in the molded part. Formation of clumps and/or resin-rich areas leads to erratic and non-uniform physical properties throughout the molded piece. Fiber glass clumps also have a tendency to collect on the surface of the molded articles interfering with subsequent operations such as painting, vacuum metalizing, or plating.

In addition to the above, when concentrates of glass fiber reinforced resins are tumbled with other resins preparatory to melt blending, the physical action of tumbling results in fiberglass splitting and breakage in the more concentrated resins and thereby result in waste and inaccurate blending.

STATEMENT OF THE INVENTION

It is an object of this invention to prepare novel shaped articles of thermoplastic resin reinforced with glass fibers in which the fibers are present in improved dispersion.

It is a further object of this invention to provide glass fiber molding compositions which yield molded forms having improved glass fiber dispersion and physical properties.

It is still another object of this invention to provide thermoplastic pellet granules containing glass fibers therein and being suitable for blending with unreinforced resins, the resulting products having improved physical properties and improved glass fiber dispersion.

It is a further object of this invention to provide a process for preparing molding compositions containing a high concentration of glass filaments in a high dispersable form.

It is a further object of this invention to provide a process enabling a more complete and homogeneous dispersion of glass fiber in a melt of thermoplastic resin, which process results in products having better properties and improved glass dispersion.

The foregoing objects are accomplished at least in part by providing a novel composition comprising a thermoplastic resin reinforced with glass fibers, said compositions containing a minor amount by weight of a dispersing aid selected from the group consisting of a high viscosity hydrocarbon lubricant, a plasticizer and a low molecular weight resin. In one embodiment of this invention the glass fibers are contained in a thermoplastic resin pellet and said fibers are aligned generally in the direction of the long axis of the pellet. In another embodiment, the glass fibers are contained in said pellet or granule in amounts ranging from about 20 to 90 percent by weight, preferably 40 to 80 percent by weight.

The invention also provides a process for facilitating dispersion of glass fibers in a melt forming operation to provide an article having a more complete and homogeneous dispersion of glass fibers which process comprises employing a minor amount of a dispersion aid selected from the group consisting of a high molecular weight hydrocarbon, a plasticizer and a low molecular weight resin, the amount of the aid being sufficient to lower the viscosity of the resin surrounding the glass fibers relative to the viscosity of the resin having substantially no glass fiber reinforcement, the viscosities referred to being those of the melt at the forming temperature.

In order to understand further some of the terms used in the specification herein, the following terms shall have the meaning noted:

(a) Short glass fibers (or about fiber glass)—These are glass fibers having a maximum length of up to one eighth (⅛) of an inch. They may be as short as 0.02 inch as noted above, in reference to the prior art.

(b) Long glass fibers—These are glass having a length above one eighth (⅛) of an inch and up to one and one half inches (1½), and generally range between one fourth (¼) to one half (½) of an inch.

(c) Concentrated or masterbatch glass reinforced resins—These are resins which can be usually let down, that is, blended with unreinforced resins of the same kind. The most useful resins of this type are those containing from about 40 to 80 percent by weight of glass (which can be in the form of long glass fibers).

(d) Dispersion aids—According to this invention, these encompass a wide variety of compositions, their chief function of which is to provide a more homogeneous dispersion of glass in the final formed article. Since most operations for forming shaped articles go through a melt stage, it is at this stage that the dispersion aids are primarily beneficial and it is at this stage where they facilitate a more homogeneous dispersion of the glass fibers whether they be short or long glass. In this category, therefore, there are diverse materials which are suitable so long as they have the effect of reducing the viscosity of the resin surrounding the glass fiber relative to the viscosity of the surrounding or unreinforced resin at the melt temperature.

(e) High viscosity hydrocarbon—This type of lubricant is one having a viscosity in centistokes of at least 10 and up to 120 at 100° F., and a boiling point range of from 200° to 800° C. or higher, preferably 400° F. and above. These are also inert hydrocarbon oils (usually containing no unsaturates or aromatic hydrocarbons) and their viscosity can also be expressed in Saybold universal seconds and this ranges from 200 to 1,000.

The dispersion aids suitable for use in accordance with this invention are those selected from the group consisting of high viscosity hydrocarbon lubricants, plasticizers and low molecular weight resins. In the lubricant group belong high viscosity hydrocarbon having SUS viscosities of from about 200 to 1,000 and boiling points ranging from 200° F., preferably 400° F. to 800° F. Mineral oil is typical of the high viscosity hydrocarbons useful herein.

The plasticizers include any of the well known group heretofore used for that purpose with thermoplastic resins such as poly(vinylchloride). Examples of these include dioctyl phthalate, didodedcyl phthalates, tricresyl phosphate, tributoxy ethylphosphate and "Santicizer 8" which is a mixture of ortho and para-N-ethyl toluene sulfonamides ($CH_2C_6H_4$—$SO_2NHC_2H_5$; M.W. 199.26).

The low molecular weight resins are thermoplastic resins of a very high melt flow (as per ASTM–D–1238–62T) and consequently these resins have a lower viscosity at the melt temperature involved in the forming operation than the unreinforced resin with which it is being blended with. The melt flow of these low molecular weight resins should therefore be high enough so that they will permit dispersion of the glass, i.e. by having a lower melt viscosity at the forming temperature than the surrounding resin. Typical examples here are thermoplastic resins having a melt flow of about 50 to 250 or higher, that is, up to 5,000. Thus a polypropylene or polyethylene of a melt flow of 200 to 400 can be used to coat the glass fibers or as an additive to the resin surrounding the glass fibers. Similarly, polystyrene of a melt flow of about 100 to 200 or styrene-acrylonitrile polymer can also be used. Any thermoplastic resin therefore, including nylon and others, can be used as the low molecular weight material so long as it has a high melt flow as indicated. The lower viscosity resin can therefore be used alone as the coating for the glass fiber in the glass fiber resin matrix or in smaller amounts so long as the total resin binding the glass has a significantly lower viscosity than the resin with which it is to be blended.

The common feature of the dispersion aids is that they are all partially or wholly soluble in the resin at elevated temperatures such as at the temperature of the melt and this is required in order that the viscosity of the melt be lowered, that is, the viscosity of the melted resin surrounding the glass fiber. Thus the dispersion aids must have sufficient solubility in the melt to accomplish the function of lowering the melt viscosity. The resins can be solids or liquids and they can be incorporated into the thermoplastic resin in any number of ways. The amount of dispersion aid varies but, in general, as little as 0.5 percent by weight shows beneficial results. A suitable range is 0.5 to 10 percent by weight preferably 2 to 8 percent. As noted in some cases, such as the low molecular weight high melt flow resins, the amount can be high especially if this is the resin used to coat the glass fibers per se.

PREFERRED EMBODIMENTS

It is preferred according to the process of this invention that when a blend of glass fiber reinforced resin is prepared with a non-reinforced resin that the final product contain from 1 to 2 percent of dispersion aid even though amounts as low as 0.1 percent by weight can be contained beneficially therein. As a general rule, however, the higher the amount of glass in the unblended glass fiber reinforced resin, the more dispersing aid is required.

The dispersing aid can be added to the glass fiber composition in any suitable way. Thus where a high viscosity hydrocarbon is employed, such as mineral oil, this can be added directly to the pellets or granules and allowed to contact these for a period of from 10 minutes to 24 hours. Tumbling of the pellets with the mineral oil will help in the absorption of the oil into and apparently next to the glass fibers. The mineral oil or plasticizer, in the event it is a liquid, can be added as above or it can be added to an emulsion, solution or suspension of the resin that is to be used in impregnating the glass fibers in accordance with the technique of Bradt Pat. 2,877,501 or the technique disclosed in U.S. Pat. 3,119,718, the disclosures of which are incorporated herein by reference.

In the method of U.S. Pat. 3,119,718 glass strands or rovings are fed from suitable creeds through a bath which can be in the form of a water emulsion or solution of the thermoplastic resin or a solution of the thermoplastic resin in an appropriate solvent which impregnates the strand or roving. In this embodiment, the dispersion aid is also added to the bath in an amount sufficient so that the resulting granules contain the quantity indicated above. The strand is next passed through an oven in which the water of the emulsion, or the solvent of the solution, is driven off and the resin fused. The oven is usually operated at temperatures of 400° F. to 600° F., and consequently care should be exercised that the liquid dispersion aids do not evaporate excessively at these temperatures. The impregnated strand after solidification of the resin is passed near a series of heaters wherein the temperatures of the strand is raised, when required, to an appropriate temperature wherein it will be ready for pelletizing. After the strand is cut, it is then screened to remove undesirable cut product therefrom and it is then ready for packaging. Although the foregoing general process steps are descriptive of what occurs in one embodiment of the process herein, a more detailed disclosure of each of the general steps indicated above can be found in U.S. Pat. 3,119,718 of Jan. 28, 1964.

As indicated, in the case of some liquid dispersing aids such as mineral oil, the technique for adding it is simply to apply it to the surface or the dispersing aid liquids and dispersing aid solids can be added to the glass fiber strands earlier in the operation.

The liquid dispersing aids, as well as the solid dispersing aids, can also be added to the glass fiber by dissolving these in a melted thermoplastic resin and employing the process for glass fiber impregnation as disclosed in U.S. Pat. 3,042,570. In this case glass fiber strands pass into a chamber or reservoir, containing a supply of molten thermoplastic resin and an appropriate quantity of dispersion aid. The apparatus used may contain intermediate its length, the reservoir which can contain a gathering die which gathers the strands into a single bundle which emerge from the reservoir through an orifice in alignment with the gathering die. After cooling in any appropriate manner, as by passage through a water bath to solidify the thermoplastic resin applied in the reservoir, the bundle passes between feed rolls which serve to draw the strands or rovings through the apparatus. After leaving the rolls the bundle passes into association with a shear which cuts into short lengths to form the desired pellets or granules. When necessary, impregnated strand may be passed near a series of heaters wherein the temperature of the strand is raised to an appropriate temperature wherein it will be ready for pelletizing in unit. As in the case above, while the above refers to general process steps a more complete and detailed description of the apparatus can be had by reference to U.S. Pat. 3,042,570, the disclosure of which is incorporated herein by reference. It should be mentioned here that although in neither U.S. Pat. 3,119,718 or 3,042,570 is there a positive heating step shown for the impregnated strand prior to pelletizing, in order to have the strand in a condition suitable for pelletizing such a heating step can be necessary and can be readily provided. A suitable source for such heat is infra-red radiation unit.

The preferred compositions of this invention are those containing from 40 to 80 percent glass fibers by weight in a granule of a length of from one fourth (¼) of an inch to one half (½) of an inch and a diameter of approximately one sixteenth (¹⁄₁₆) to one eighth (⅛) of an inch. The diameter of the glass fibers in the preferred form are also very small since glass fibers usually consist of about 204 filaments to a strand and having a weight of about 15,000 yards per pound. The glass fiber can be of the long variety or the short or mixtures thereof. It is preferred that the fibers be aligned in the direction of the longest axes of the pellet in the case of long glass fibers. Also, in the case of long glass fibers, some, and in some cases substantially all, of the fibers will be substantially the same length of the long axes of the granule due to the method of manufacture.

In the process of this invention, a final article can be prepared from a blended mixture of unreinforced resin with a glass reinforced resin (of the long glass or short glass or a mixture of two such reinforced resins) as taught herein to obtain an improved product.

The use of a small amount of dispersion aid, such as mineral oil in amounts indicated beneficial also prevents the glass reinforced resin, for instance glass reinforced polystyrene, from splitting or breaking during the necessary blending and molding operations.

It was surprising that in the case of the liquid dispersion aids such as the mineral oil that it can be used to give the good effects which it achieves since it would be expected that it would "leak" from the composition and cause staining. Prolonged exposure of glass-resin samples containing the oil to paper bag storage have failed to show any staining of the paper bags by oil.

It has been found possible to employ the dispersion aids in either a regular fiber glass reinforced resin or in concentrates of glass fiber containing resins having relatively high amounts of glass (up to 90%) which products are "let down," or blended to regular fiber glass reinforced products prior to molding. The glass content in the final composition should be at least 10 percent by weight of glass fiber, preferably 20 percent and higher in order to obtain the properties desired in the molded article, and at the same time permit the compound to be handled in the conventional melt forming machines.

In all instances it was found that the dispersion aids added had no substantial adverse effects on the physical properties of the reinforced resin. In many cases the physical properties were substantially enhanced.

Any thermoplastic resin can be used in the process of and in making the improved compositions of this invention. Such thermoplastic resins include polystyrene, the acrylic resins (i.e. styrene-acrylonitrile copolymers), acrylonitrile-butadiene-styrene (ABS) resins, polyvinyl chloride resins, polyformaldehyde resins, polysulfone resins, polyphenylene oxide resins, polyamide resins such as nylon, polyester resins, polyolefin resins, polycarbonate resins, and many others.

The following examples are offered to illustrate the invention.

EXAMPLE 1

A glass fiber reinforced molding resin comprising a polystyrene containing 4% of added mineral oil and having 80% glass fibers was blended with unreinforced polystyrene to give a final product having 20% glass fiber content. The mixture was blended for 5 to 10 minutes. The sample containing 20% fiber was used for molding with standard injection molding equipment and the molded pieces subjected to testing. It was found that the addition of the oil had resulted in better glass dispersion than is usually found when no oil is added to the glass reinforced polystyrene. The heat distortion temperature of the reinforced polystyrene was improved by several degrees in comparison to unreinforced polystyrene containing even less mineral oil.

EXAMPLE 2

A polystyrene fiber glass reinforced resin having 80% long glass fibers was blended for 5 minutes with 4% mineral oil. In a similar manner an SAN (styrene-acrylonitrile copolymer) resin with 80% long glass fibers was blended with 4% mineral oil. Each of these was then blended with three parts unreinforced polystyrene and SAN respectively to give 20% glass in the final blends (tumbled, i.e. drum blended). Each of the products was then separately stored in paper bags and allowed to remain for three days. The oil present in the resin glass blends did not stain the paper bags.

The physical properties of these oil containing products were compared with the same resin glass products containing no oil. The results of these comparative studies are shown in the table below.

It is apparent from this data that a number of advantages result from the use of the oil in the glass reinforced resin. A marked improvement, as compared with the control is shown in the glass dispersion in the resin when the oil is present. No pertinent properties were lost in this operation, i.e. equivalent properties were retained. No significant loss in heat deflection temperature was noted even though the resin had 4% added mineral oil.

used as the dispersing aid and concentrate for blending with a crystalline polypropylene of melt flow of about 5 to 6 to obtain a product having 20 percent glass fiber of improved dispersion.

EXAMPLE 5

In this example, 4 percent by weight of tricresyl phosphate was added to a styrene-acrylonitrile copolymer (SAN) containing 80 percent long glass fiber and this was blended with general purpose SAN. The product (which had a final 20% glass fiber) had improved glass dispersion.

EXAMPLE 6

The procedure of Example 5 was followed except that "Santicizer 8" (sulfonamides) was used as the dispersing aid and again excellent results were obtained.

TABLE

| Properties | Blend of 0% glass and unreinforced to give a 20% glass reinforced (polystyrene) | 80% glass with 3 parts unreinforced to give a 20% glass reinforced and 4% mineral oil (polystyrene) | 40% glass in SAN plus unreinforced SAN to give 20% glass SAN | 80% glass SAN with 3 parts SAN to give 20% glass SAN and 4% mineral oil |
|---|---|---|---|---|
| Tensile, p.s.i. | 9,310 | 11,550 | 11,490 | 14,890 |
| Elongation, percent | 1.11 | 1.53 | 1.37 | 1.87 |
| Flexural, p.s.i. | 14,670 | 15,700 | 18,660 | 20,270 |
| Deflection temp., °F. at 26 p.s.i. | 218 | 214 | 216 | 210 |
| Izod impact, ft./lbs./in. | 1.02 | 0.89 | 0.81 | 0.76 |
| Water absorption in 2 hours at 73° F., percent | 0.09 | 0.07 | 0.22 | 0.20 |
| Specific gravity | 1.19 | 1.18 | 1.22 | 1.22 |

The above data show that there is no significant change in physical properties when mineral oil is added. Surprisingly there was hardly a loss in deflection temperature especially in view of the fact that 0.3% mineral oil will cause a 20° F. loss in deflection temperature in unreinforced polystyrene. In the above, as in other tests indicated herein, the following ASTM designations apply:

| | |
|---|---|
| Tensile, p.s.i. | D638 |
| Elongation, percent | D638 |
| Flexural | D790 |
| Deflection | D648 |
| Izod | D256 |
| Water absorption | D570 |
| Specific gravity | D792 |

EXAMPLE 3

Part A

A styrene-acrylonitrile copolymer of 16 melt flow was prepared by polymerizing in aqueous suspension, a substantially 75/25 styrene to acrylonitrile monomer ratio mixture. The suspending agent was a hydroxyethyl cellulose and the initiator was t-butyl perbenzoate. The molecular weight controller employed was t-dodecyl mercaptan. A nine hour cycle was employed in the polymerization, namely from 185 to 240° F. for six hours and from 240° F. to about 260° F. for three hours.

Part B

A styrene-acrylonitrile similar to the above was prepared except that the cycle and the mercaptan were altered sufficiently to result in an SAN having a melt flow of 160.

Part C

In this example, the Part B resin was used to impregnate a glass fiber in accordance with the technique disclosed in U.S. Pat. 3,042,570 described above to obtain a resin which was then blended with the resin of Part A. The lower melt viscosity of resin B served as an excellent media for homogeneous dispersion of the glass fibers throughout the melted resin.

EXAMPLE 4

In a manner similar to Example 3 above, a polypropylene (crystalline) of melt flow of about 200 can be The above examples obviously adequately illustrate the process of this invention and demonstrates the success achieved by employing the dispersing aids disclosed. It will be understood that the key to the success of better dispersability is believed to be the following explanation: as the temperature is increased in the blending operation involving the glass fiber reinforced and unreinforced resin, the fluidity of the resin surrounding the glass fibers increases over that of the more viscous unreinforced resin and as the forming temperature is approached, i.e. the melt, the glass fibers disperse readily over the entire mass. A significantly lower viscosity of the resin surrounding the glass fibers is therefore essential to the invention.

The unpublished process and novel composition involving concentrates of glass reinforced thermoplastic resins having 80 and up to 90% glass fibers therein theretofore alluded to is the subject of copending application, U.S. Ser. No. 677,969 filed Oct. 25, 1967. Generally, that specification teaches that certain critical steps in the process are required to lead successfully to the highly glass concentrated resins and reference may be had to said specification for further elucidation regarding these high glass concentrates.

The formed products, such as molded products prepared in accordance with this invention have highly pleasing visual appearance, that is, the glass fibers are improved in dispersion and the products are glossier. The products can also be vacuum metalized and painted and there are no clumps of glass showing in the surface. In addition to these important advantages, the compositions herein permit the molding or extrusion operations to be carried out with greater efficiency to employ lower temperatures and back pressures, and faster cycles for injection molding operations.

Resort can be had to equivalents within the scope of this invention.

What is claimed is:

1. A glass fiber reinforced thermoplastic resin pellet comprising a thermoplastic resin having incorporated therein from about 20 to about 90 percent by weight of glass fibers and a minor amount of a dispersion aid, said glass fibers being substantially aligned in a singular direction of the pellet, said dispersion aid being a hydrocarbon having an SUS viscosity (at 100° F.) in the range of about 200 to about 1000 and a boiling point in the range of about 200° F. to about 800° F., dioctyl phthalate, didodecyl phthalate, tricresyl phosphate, tributoxy ethylphosphate, a mixture of σ- and p-N-ethyl toluene sulfonamides, or a low molecular weight resin having a melt flow in the range of about 50 to about 5000 (ASTM D–1238–62T).

2. A glass fiber reinforced thermoplastic resin pellet according to claim 1 wherein the thermoplastic resin is a polystyrene, styrene-acrylonitrile copolymer, acrylonitrile-butadiene-styrene resin, polyformaldehyde, polysulfone, polyphenylene oxide, polyamide, polyester, polyolefin, or polycarbonate.

3. A glass fiber reinforced thermoplastic resin pellet according to claim 2 wherein the glass fibers are present in an amount of about 60 to about 90 percent by weight.

4. A glass fiber reinforced thermoplastic resin pellet according to claim 2 wherein the amount of the dispersion aid ranges from about 0.5 to 8 percent by weight.

5. A glass fiber reinforced thermoplastic resin pellet comprising a thermoplastic resin having incorporated therein from about 20 to about 90 percent by weight of glass fibers and a minor amount of a hydrocarbon dispersion aid having an SUS viscosity (at 100° F.) in the range of about 200 to about 1000 and a boiling point in the range of about 200° F. to about 800° F., said glass fibers being substantially aligned in a singular direction of the pellet.

6. A glass fiber reinforced thermoplastic resin pellet according to claim 5 wherein the thermoplastic resin is a polystyrene, styrene-acrylonitrile copolymer, acrylonitrile-butadiene-styrene resin, polyformaldehyde, polysulfone, polyphenylene oxide, polyamide, polyester, polyolefin, or polycarbonate.

7. A glass fiber reinforced thermoplastic resin pellet according to claim 6 wherein the glass fibers are present in an amount of about 60 to about 90 percent by weight.

8. A glass fiber reinforced thermoplastic resin pellet according to claim 6 wherein the amount of dispersion aid ranges from about 0.5 to 8 percent by weight.

9. A glass fiber reinforced thermoplastic resin pellet comprising a thermoplastic resin having incorporated therein from about 20 to about 90 percent by weight of glass fibers and a minor amount of a low molecular weight resin having a melt flow in the range of about 50 to about 5000 (ASTM D–1238–62T) as a dispersion aid, said glass fibers being substantially aligned in a singular direction of the pellet.

10. A glass fiber reinforced thermoplastic resin pellet according to claim 9 wherein the thermoplastic resin is a polystyrene, styrene-acrylonitrile copolymer, acrylonitrile-butadiene-styrene resin, polyformaldehyde, polysulfone, polyphenylene oxide, polyamide, polyester, polyolefin, or polycarbonate.

11. A glass fiber reinforced thermoplastic resin pellet according to claim 10 wherein the glass fibers are present in an amount of about 60 to about 90 percent by weight.

12. A glass fiber reinforced thermoplastic resin pellet according to claim 10 wherein the amount of the dispersion aid ranges from about 0.5 to 8 percent by weight.

13. A resin-glass fiber composition suitable for forming into shaped articles by molding and extrusion techniques wherein the articles have improved uniformity of dispersion of glass fibers, said composition comprising a blend formed from an unreinforced thermoplastic resin and a reinforced thermoplastic resin, said reinforced resin being in the form of pellets each of which has incorporated therein from about 20 to about 90 percent by weight of glass fibers and a minor amount of a dispersion aid, said glass fibers being substantially aligned in a singular direction of the pellet, and said dispersion aid being a hydrocarbon having an SUS viscosity (at 100° F.) in the range of about 200 to about 1000 and a boiling point in the range of about 200° F. to about 800° F., dioctyl phthalate, diodecyl phthalate, tricresyl phosphate, tributoxy ethylphosphate, a mixture of σ- and p-N-ethyl toluene sulfonamides, or a low molecular weight resin having a melt flow in the range of about 50 to about 5000 (ASTM D–1238–62T).

14. A glass fiber reinforced thermoplastic resin pellet according to claim 13 wherein the thermoplastic resin is a polystyrene, styrene-acrylonitrile copolymer, acrylonitrile-butadiene-styrene resin, polyformaldehyde, polysulfone, polyphenylene oxide, polyamide, polyester, polyolefin, or polycarbonate.

15. A glass fiber reinforced thermoplastic resin pellet according to claim 14 wherein the glass fibers are present in an amount of about 60 to about 90 percent by weight.

16. A glass fiber reinforced thermoplastic resin pellet according to claim 14 wherein the amount of the dispersion aid ranges from about 0.5 to 8 percent by weight.

17. A process for producing a shaped article from a resin-glass fiber composition wherein the articles have improved uniformity of dispersion of glass fibers comprising extruding or molding said composition into the shaped article, said composition comprising glass fiber reinforced thermoplastic resin pellets each of which has incorporated therein from about 20 to about 90 percent by weight of glass fibers and a minor amount of a dispersion aid, said glass fibers being substantially aligned in a singular direction of the pellet, said dispersion aid being a hydrocarbon having an SUS viscosity (at 100° F.) in the range of about 200 to about 1000 and a boiling point in the range of about 200° F. to about 800° F., dioctyl phthalate, didodecyl phthalate, tricresyl phosphate, tributoxy ethyl phosphate, a mixture of σ- and p-N-ethyl toluene sulfonamides, or a low molecular weight resin having a melt flow in the range of about 50 to about 5000 (ASTM D–1238–62T).

18. A process according to claim 17 wherein the thermoplastic resin is a polystyrene, styrene-acrylonitrile copolymer, acrylonitrile-butadiene-styrene resin, polyformaldehyde, polysulfone, polyphenylene oxide, polyamide, polyester, polyolefin, or polycarbonate.

19. A process according to claim 17 wherein the dispersion is a mineral oil.

20. A process according to claim 17 wherein said composition comprises said glass fiber reinforced thermoplastic resin pellets and an unreinforced thermoplastic resin, the amount of unreinforced thermoplastic resin being sufficient to result in a glass fiber content of at least 10% by weight in the composition.

References Cited

UNITED STATES PATENTS

| | | | |
|---|---|---|---|
| 3,468,840 | 9/1969 | Heiberger et al. | 260—41 |
| 3,324,070 | 6/1967 | Hostettler | 260—874 |
| 2,981,980 | 5/1961 | Brown et al. | 264—108 |
| 3,396,142 | 8/1968 | Little et al. | 260—41 |

FOREIGN PATENTS

| | | | |
|---|---|---|---|
| 575,415 | 5/1959 | Canada | 264—108 |

OTHER REFERENCES

Chem. Abst. 51: 6485d, 1957. Copy in Chem. Library.

MORRIS LIEBMAN, Primary Examiner

T. MORRIS, Assistant Examiner

U.S. Cl. X.R.

260—32.6, 33.6, 37, 41, 874; 264—108